INVENTOR.
PHILLIP S. MITTELMAN

Jan. 28, 1969   P. S. MITTELMAN   3,423,844
SIMULATION OF NUCLEAR WEAPONS RADIATION
Filed April 12, 1966

INVENTOR
PHILLIP S. MITTELMAN

BY

ATTORNEYS

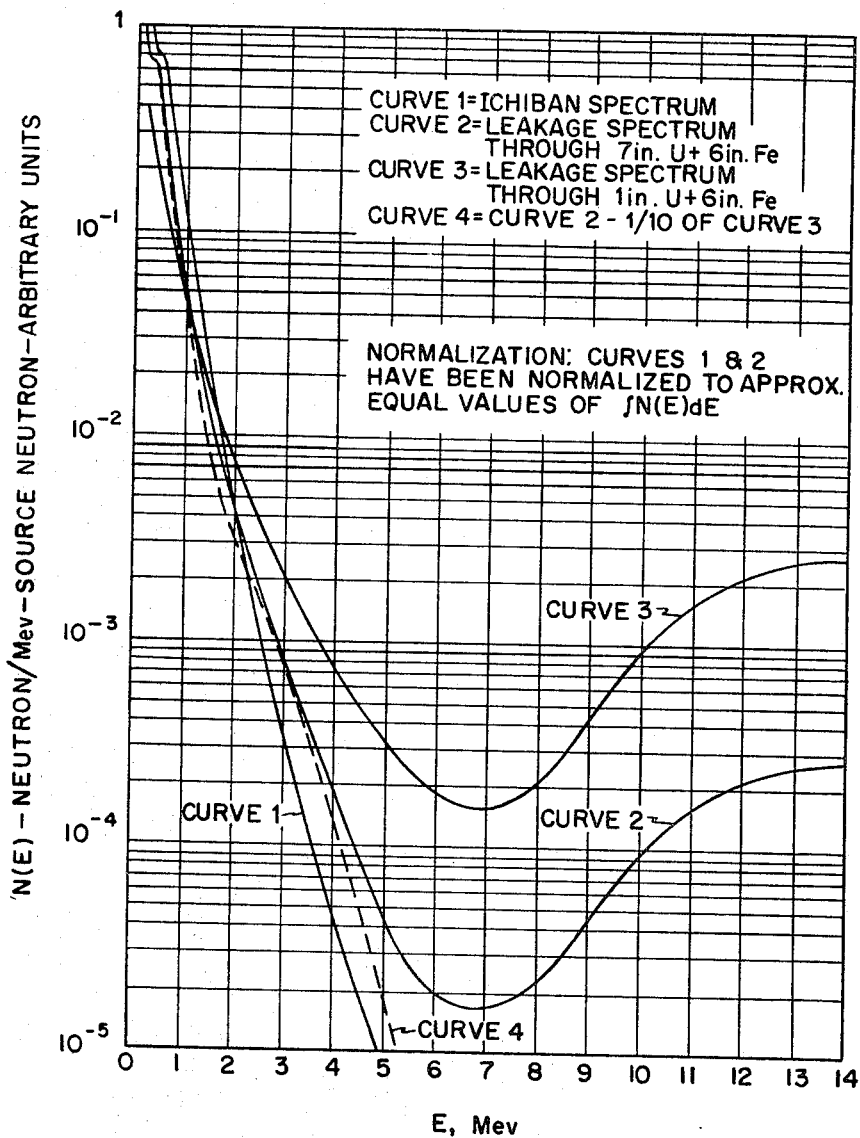

United States Patent Office 3,423,844
Patented Jan. 28, 1969

3,423,844
SIMULATION OF NUCLEAR WEAPONS RADIATION
Phillip S. Mittelman, Armonk, N.Y., assignor to United Nuclear Corporation, White Plains, N.Y., a corporation of Delaware
Filed Apr. 12, 1966, Ser. No. 542,152
U.S. Cl. 35—1                    15 Claims
Int. Cl. G09b 23/00; G21g 1/00

ABSTRACT OF THE DISCLOSURE

An artificially generated radiation environment which simulates the radiation spectrum produced by a detonated nuclear weapon is provided by directing a beam of hydrogen ions to a target plate containing a material adapted to react with the impinging ions to produce neutrons having an energy level of approximately 14-mev. The target plate is at least partially surrounded with multiple successive layers of spectrum conditioning materials of which the first layer is capable of undergoing fission and nuclear reactions to provide a degraded spectrum of both neutrons and gammas and subsequent layers capable of moderating the resultant leakage radiation thereby simulating the nuclear weapon spectrum.

---

This invention relates to an artificially generated radiation environment and more particularly to an apparatus and a method for producing such environment which simulates the radiation spectrum produced by a detonated nuclear weapon.

To evaluate the shielding effectiveness of structural materials and particular structures, to determine the neutron activation of organic and inorganic substances, to measure dose levels inside tissue equivalent phantoms and to study the effect on other substances and other physical and chemical phenomena produced by nuclear weapon radiation require a convenient radiation environment for the experiments. Detonation of a nuclear weapon to create such environment is not practical for many of these experiments and has obvious disadvantages. Heretofore monoenergetic neutron sources are used instead for many of the studies. The results of these studies, while useful, are not completely accurate because of the inherent nature of the neutron source used which lacks the combination of fission and fusion neutron components as well as the highly penetrative gammas. Many of these experiments would be greatly enhanced if carried out with an actual weapon spectrum instead of a monoenergetic neutron source.

I have now found that an artificially generated radiation environment which simulates the radiation spectrum produced by a detonated nuclear weapon can be easily provided in accordance with the present invention by a method which comprises directing a beam of hydrogen ions to a target plate containing a material adapted to react with the impinging ions to produce neutrons having an energy level of approximately 14 mev., and surrounding the target plate with multiple layers of spectrum conditioning materials of which the first layer is capable of undergoing fission and nuclear reactions to provide a degraded spectrum of both neutrons and gammas and subsequent layers capable of moderating the resultant leakage radiation thereby simulating the nuclear weapon spectrum.

Broadly stated, the radiation environment which simulates a nuclear weapon spectrum is created by an apparatus of this invention which comprises a neutron source capable of emitting neutrons having an energy level approximately equivalent to a maximum energy level of the nuclear weapon and multiple layers of materials disposed adjacent to the neutron source. The first layer next to the source is a fertile nuclear material containing fissionable isotopes and at least one additional layer of a spectrum conditioning material.

Any convenient neutron source which can provide neutrons having an energy level of approximately equivalent to a maximum energy level of a nuclear weapon can be used for the present invention. I find a neutron source of the type wherein ions such as protons, deutrons or tritons are produced by a field emission ion source and accelerated to a suitable target which contains a substance adapted to react with impinging ions for the production of neutrons to be eminently suitable. In this type of neutron generator the ion source generally is a member composed of a suitable metal such as titanium, palladium, nickel, niobium, and tantalum in which there is absorbed a large quantity of hydrogen gas. Similarly, the target is made of the above-mentioned metals in which a large quantity of hydrogen tritium is occluded. In this type of generator the neutrons are produced by a D-T reaction. The neutrons produced by this type of reaction are fast neutrons having about 14 mev. energy which is approximately equivalent to the maximum energy level of an actual nuclear weapon radiation.

The first layer of spectrum conditioning materials can be any suitable fertile nuclear material. For economical reasons, natural uranium or depleted uranium may be used. The thickness of this layer which at least partially surrounds the target plate of the neutron generator can be varied in a wide range depending on the neutron energy and the radiation of a weapon in which the apparatus of the present invention is adapted to simulate. For depleted uranium, for example, I find a range from 0 to 7 inches to be adequate for simulation of the existing range of weapon spectra.

Immediately adjacent to the layer of fertile nuclear material may be an atmosphere simulating material such as liquid air or liquid nitrogen which can be stored in a cryogenic tank. Preferably, additional layers of moderating materials are used between the layers of fertile nuclear materials and the atmosphere simulating material. The moderating material may be any suitable organic polymeric compounds such as polyethylene, polypropylene, polyurethane, etc. Metals such as steel or nickel may also be used to condition the spectrum when an inelastic scatter is desired.

In operating the weapon spectrum generator of this invention some of the fast neutrons from the source penetrate the uranium without interaction providing fast neutron components, e.g., 14 mev. component, to the leakage neutron spectrum while other fast neutrons cause fission or undergo $(n, n')$, $(n, 2n)$ and $(n, 3n)$ reactions. The resulting lower energy neutrons can leak out directly or undergo second and third generation reactions. These interactions provide a degraded fission spectrum type component of both neutrons and gammas. By adjusting the uranium thickness and the thickness of the moderating material a wide range of variations of the relative proportions of fission and fusion components from predominantly fast neutrons to a spectrum similar to that from a pure fission source can be obtained.

Further to illustrate the present invention specific embodiments of the present invention are described hereinbelow with reference to the accompanying drawings wherein:

FIG. 6 is a simulation of an Ichiban spectrum.

Figure 1:
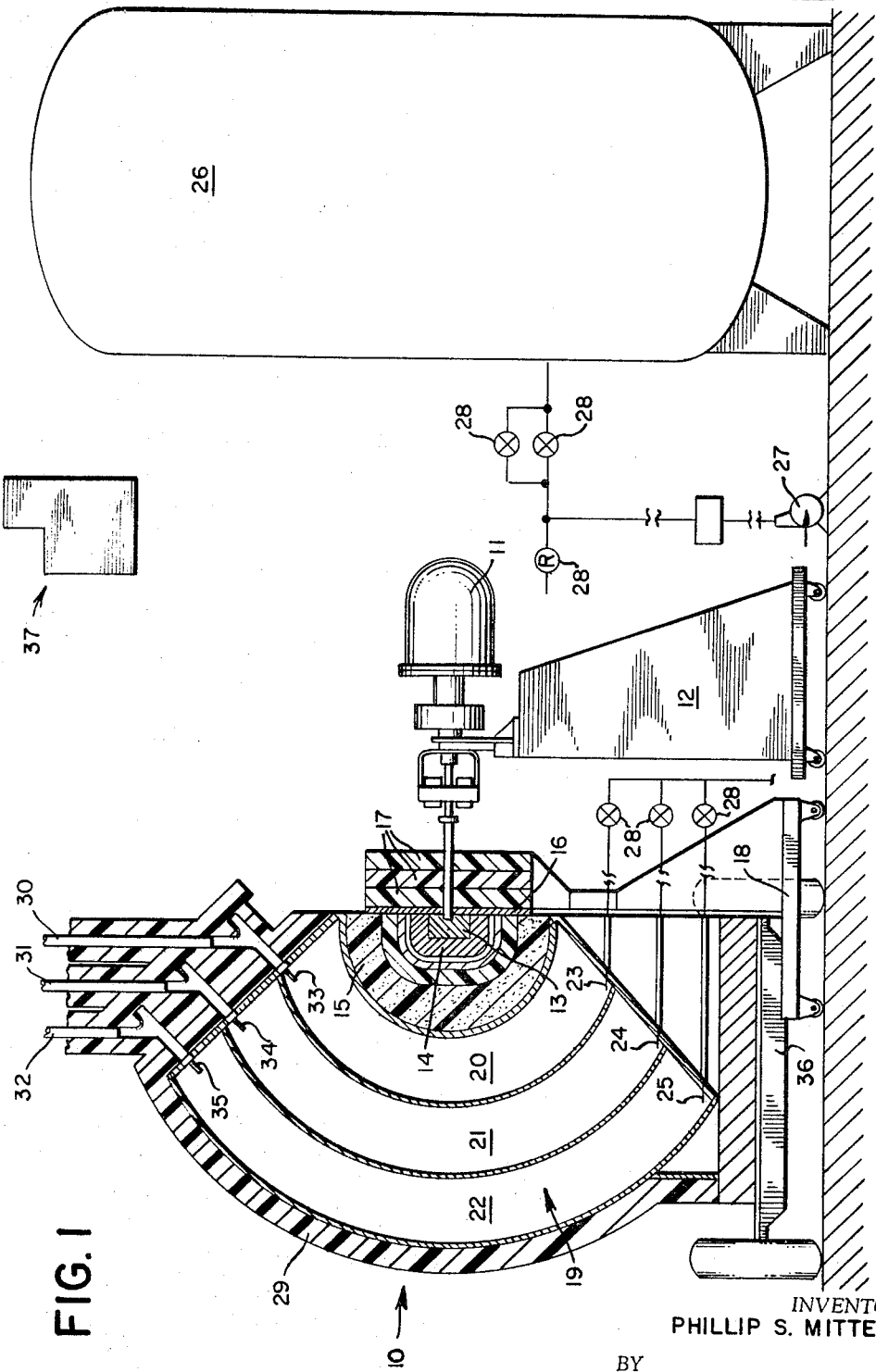
FIG. 1 is a side elevational view partially in cross-section and partially in schematic diagram of one embodiment of the weapon spectrum generator of the present invention.

Referring initially to FIG. 1 the weapon spectrum generator 10 of this invention has a neutron generator 11 mounted on a moveable support 12. The neutron generator 11 is a commercial unit marketed under the trade designation of TMC 1100 and having a nominal maximum output of about $10^{11}$ 14 mev. neutrons per second. The structure of the unit is modified for adaptation to the present apparatus. In the generator the hydrogen ions are accelerated and caused to impinge on a target plate 13 in which the hydrogen isotopes are occluded. The impinging ions cause a D-T reaction which generates neutrons of about 14 mev. energy. The target plate 13 is embedded in a block of depleted uranium 14. The block of uranium is preferably composed of multiple removable layers the design of which is for the convenience of reducing or increasing the uranium thickness. Surrounding the uranium is a polyethylene layer 15 which is in the form of hemisphere. The polyethylene layer may be made of different thickness and fabricated to mate with the uranium block.

The construction and the design of the uranium block and the polyethylene layer are such as to provide maximum flexibility and interchangeability so that a maximum number of configurations consisting of various thickness of uranium and plastic layers can be obtained. In the present embodiment the thickness of the uranium layer can be varied from 0 to 7 inches and the plastic layer from 0 to 6 inches. It is understood that other fertile nuclear materials as well as other moderating materials can be used to provide a combination that creates a spectrum approximately equivalent to any nuclear weapon spectrum.

The rear of the target plate and exposed uranium surface are shielded to reduce background radiation levels from neutrons leaving the rear of the configuration. Multiple layers of steel 16 and borated plastic 17 are found to be suitable. For convenience and portability the target and the uranium and polyethylene layers as well as the rear shield are preferably mounted on a wheel-supported dolly 18.

Surrounding the layer of polyethylene 15 is an atmosphere simulator tank 19 which is a 4 foot thick vessel and quadro-sphere in shape. The vessel has three internal layers 20, 21, and 22 any or all of which filled with liquid nitrogen through inlets 23, 24 and 25, respectively. The inlets are connected to separate liquid nitrogen tank 26. A pump 27 in combination with valves 28 control the filling and emptying of the cryogenic tank which is insulated by a plastic foam outer layer 29. The vent lines 30, 31 and 32 connected to the three separate layers of the cryogenic tank 19 provide the access for inserting instruments 33, 34 and 35 into the different layers of the tank for measuring the flux within the liquid nitrogen. Preferably, the atmosphere simulator tank is mounted on a trailer 36 for portability.

An instrumentation and remote control panel 37 is used to operate the neutron generator, the filling and emptying of the atmosphere simulating tank and to monitor the flux within said tank. The design of the generator and the use of the remote control render this system particularly desirable for laboratory use to reproduce a weapon radiation environment including the effect of transmission through up to a kilometer of ground level air.

Figure 2:
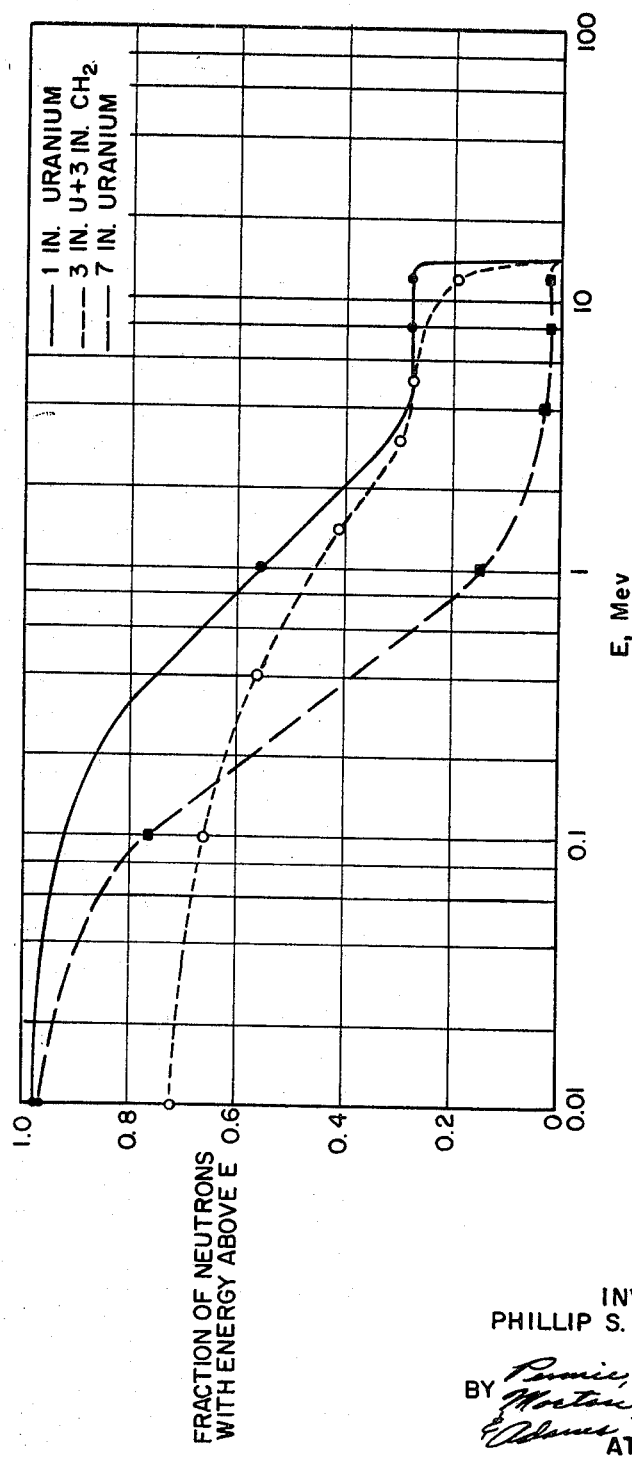
FIG. 2 is integral neutron spectra from three configurations of different uranium thickness in the generator shown in FIG. 1.

To illustrate the utility of the weapon spectrum generator 10, Monte Carlo calculations of typical neutron spectra emitted by the generator were made and are shown in FIG. 2. This figure shows the fraction of neutrons above a given energy for three different configurations of the generator. The top curve is for 1 inch of uranium and no plastic layer. In this configuration there is about 30 percent of leaking neutrons of 14 mev. The balance of neutrons resembles a degraded fission spectrum. The bottom curve is for 7 inches of uranium and again no plastic layer. Only about 2 percent of neutrons are at 14 mev. These two curves are intended to show some of the range of spectra available by use of the weapon spectrum generator of this invention. The middle curve is for a configuration with 3 inches of depleted uranium followed by 3 inches of polyethylene.

Figure 3:
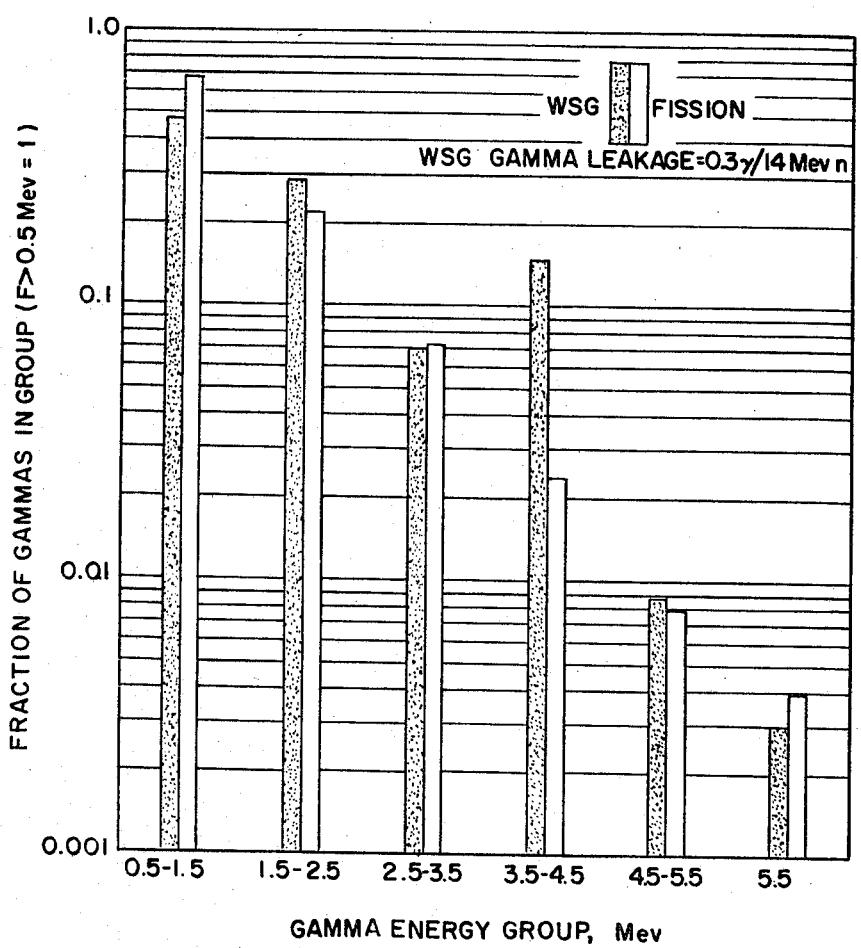
FIG. 3 is a gamma spectrum divided into groups generated by the weapon spectrum generator and compared with a reference gamma spectrum.

The gamma spectrum from the same 3 inches of uranium and 3 inches of polyethylene configuration is shown in FIG. 3 along with a fission gamma spectrum for comparison. The comparison fission gamma spectrum is usually used as an approximation to a weapon gamma spectrum. In here, the gamma above 0.5 mev. are divided into 6 energy groups. As is apparent from FIG. 3 the spectrum generated by the generator of this invention is similar to the fission spectrum with the exception of the 4 mev. group. This group produced by the generator is very high due to inelastic gammas from uranium and carbon. However, this group is also probably high in an actual weapon spectrum. The neutrons to gamma ratio emitted by this generator configuration is about 3:1. With situations involving significant penetration in the atmosphere, secondary gammas from air will be predominant of primary gammas giving perhaps an even better representation of a weapon radiation environment. Thus, the generator of this invention produces the neutron spectrum, gamma spectrum and gamma to neutron ratio of a nuclear weapon.

Figure 5:
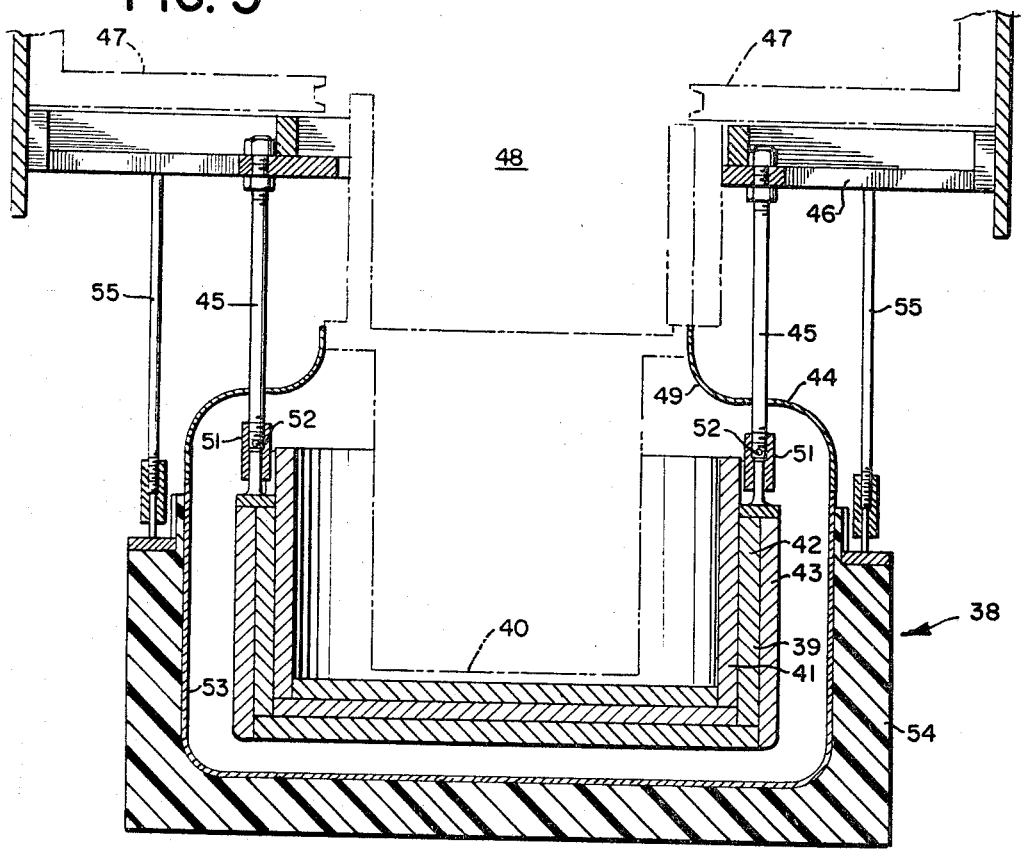
FIG. 5 is a side elevational view in cross-section of the embodiment shown in FIG. 4.
Figure 4:
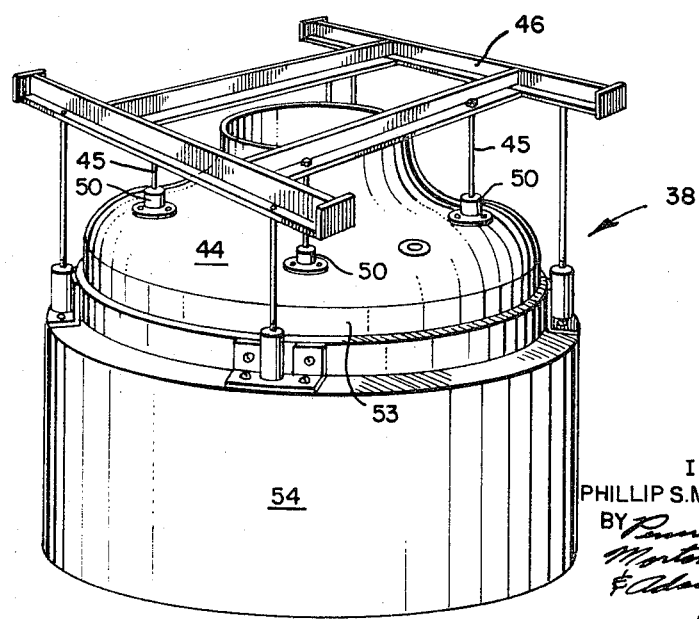
FIG. 4 is a perspective view of a second embodiment of the present invention for adaptation to existing neutron generators.

Within the scope of this invention the radiation spectrum can be produced by adaptation of one of the many available neutron generators having an adequate neutron output of sufficiently high energy. FIGS. 4 and 5 show an embodiment of the present invention adapted to use with a vertical neutron generator. In this particular embodiment, the construction is specifically designed for simulating a fusion weapon spectrum, although it is understood that the adapter can be modified to simulate any different types of nuclear weapon spectrum as will be described hereinbelow.

Referring now to FIGS. 4 and 5, the assembly 38 for simulating a fusion weapon spectrum consists of a closed-end right cylinder of uranium 39 surrounding the neutron source target 40. The inside face of the bottom closure is butted against the target assembly holder. The inside diameter of the uranium cylinder is determined by the target plate corner dimensions. Cylinder thickness can be varied from 1 to 8 inches in 1-inch increments. The innermost 1-inch thick layer 41 extends further above the target than the outer two layers 42 and 43. The uranium shapes as shown are separate open-end cylinders with bottom circular disks for bolting together as a finished assembly installed within the corona shield 44. Support of the uranium cylinder 39 is provided by four 1-inch diameter nylon rods 45 extending through the top of the corona shield 44 to a welded aluminum T section box structure 46.

Upon assembly, the support box frame 46 is bolted to the vacuum chamber housing 47 of the vertical neutron generator 48. The top half of the corona shield 49 is fastened in place around the neutron generator 48. The four nylon support rods 45 are connected to the box frame 46 at the top and extend down through the support connectors 50 of the corona shield 44. Steel couplings 51 are threaded to the bottom end of the rods and locked in place by roll pins 52. The separate 1-inch thick concentric uranium cylinders are locked together at the top by four steel support clips (not shown) to hold any or all of the three segments. This entire assembly is then lifted into place around the neutron generator and the assembly is locked in place by means of bayonet-type fasteners (not shown). After the assembly is locked in place the bottom half 53 of the corona shield 44 is then installed.

A separated 3-inch thick closed end cylinder 54 of borated polyethylene is also provided for the assembly. The cylinder 54 is designed to be installed around the outside of the corona shield 44. The polyethylene is supported by clips and nylon rods 55 in a manner identical to that described above for the uranium assembly. The provision of a separate polyethylene cylinder gives the assembly the required flexibility so experiments can be conducted with or without the moderating structure, the polyethylene cylinder. The use of moderating structure enables the assembly 38 in combination with the vertical neutron generator to simulate spectra similar to those of the two upper curves of FIG. 2.

In the present design, the extension of the uranium cylinder 39 substantially above the target plate 40 of the neutron generator 48 provides approximately 80 percent of the total solid angle (as measured from the center of the target plate) of which is covered by the uranium. The neutron source plate, however is not completely surrounded by spectrum conditioning materials. The resulting neutron emission in this case will not be isotropic. The degree of anisotropy to be expected is suggested by results shown in Table I below which applies to a configuration including 1 inch of uranium and 2 inches of plastic covering only one-half the solid angle.

TABLE I.—INITIAL ESTIMATES OF EMISSION FOR THE CASE WHERE JUST THE LOWER ONE-HALF SOLID ANGLE IS COVERED

[Per 14 mev. neutron emitted by target plate]

|  | At 14 mev. | At lower energy | Total |
| --- | --- | --- | --- |
| Emission in lower 2 solid angle | 0.12 | 0.23 | 0.35 |
| Emission in upper 2 solid angle | 0.56 | 0.50 | 1.00 |
|  | 0.62 | 0.73 | 1.35 |

Because of the absence of backscattering from the upper half-angle, the neutron emission out of the top is doubled, while the neutron emission out of the bottom is significantly reduced. Total emission is increased. This anisotropy, for the present design, however is not considered serious because of three factors:

(1) In the actual design, the uranium and plastic cover about 80 percent of the solid angle, rather than only 50 percent as assumed for the example. Thus the emission will be nearly uniform over most directions and the increased backscattering from the upper half will increase emission from the lower surfaces.

(2) The accelerator structure will contribute significantly to backscattering of neutrons leaving the top, thus tending to smooth the emisison profile.

(3) The effectiveness of neutrons leaving in the upward direction in contributing to the scattered dose in the downward direction of interest is small.

An "Ichiban" spectrum, the radiation environment produced by the Hiroshima atom bomb explosion, can also be simulated in accordance with the present invention. The assembly for simulating an Ichiban spectrum will be essentially the same as that shown in FIGS. 4 and 5. The only differences will be that the outer cylindrical layers of conditioning material will be changed from uranium to steel, and additional steel plates will be added to the bottom of the assembly. These steel plates, in the form of circular disks, will also be 1 inch thick to permit a variety of uranium and steel thicknesses.

Simulation of "Ichiban" spectrum is accomplished by approximation using a series of measurements obtainable by the above-described assembly. In the simulation of the Ichiban spectrum, the 14 mev. source neutrons are converted by passing them through a layer of depleted uranium followed by a layer of steel. For reasonable thicknesses of materials, some residual spikes of high energy neutrons (near 14 mev.) will still remain in the transmitted spectrum. However, the effect of these neutrons can be determined and eleminated by comparing two measurements with different uranium thicknesses.

The result of approximate calculations of the leakage spectra from two combinations of uranium and steel are shown in FIG. 6 (curves 2 and 3) along with the Ichiban spectrum (curve 1). The low energy end of curve 2 (7 inches U+6 inches Fe) is in fairly good agreement with curve 1 (Ichiban). The high energy end of curve 2 is due to incompletely modified 14 mev. neutrons.

Curve 2 shows 10 percent as many 14 mev. neutrons as curve 3 (the ratio of uncollided 14 mev. neutrons through the different uranium thicknesses), and this ratio remains constant with decreasing energy until the lower energy secondaries start to contribute. Thus, if 10 percent of curve 3 is subtracted from curve 2 at all energies, the 14 mev. contribution to curve 2 is eliminated. The dashed curve (4) is the result of this subtraction. Curve 4 compares well with curve 1, and the agreement could be improved by altering the U+Fe combination, or by using a better inelastic scatterer than steel, such as nickel.

I claim:

1. An apparatus for simulating various radiation spectra of detonated nuclear weapons which comprises a neutron source capable of emitting high energy neutrons with an energy level approximately equivalent to a maximum energy level of said detonated nuclear weapons and multiple successive layers of materials disposed adjacent to said neutron source, the first layer next to the source being a fertile nuclear material containing fissionable isotopes positioned within the apparatus for receiving said high energy neutrons to cause fission and nuclear reactions thereby providing degraded radiation spectrum of both neutrons and gammas, and at least one additional layer of a spectrum conditioning material, the thickness and characteristics of the fertile nuclear material and the spectrum conditioning materials being selected to allow, respectively, fission and nuclear reactions in the fertile nuclear material and leakage of radiation from the spectrum conditioning material to provide a radiation environment outside of the spectrum conditioning material similar to the spectrum of one of the detonated nuclear weapons selected for simulation.

2. An apparatus according to claim 1 wherein the second layer next to the first layer is a neutron moderating material and there is at least one additional layer of an atmosphere simulating material next to said second layer.

3. An apparatus according to claim 2 wherein said layer of fertile nuclear material has a fissionable isotope concentration sufficient to provide a degraded fission spectrum of both neutrons and gammas and to allow a portion of said high energy neutrons to pass therethrough and said moderating material has a sufficient thickness and a mass for moderating the leakage components from said first layer for simulating approximately the spectrum of said nuclear weapon.

4. An apparatus according to claim 1 wherein said neutron source is a neutron generator comprising an ion source, a target spaced apart from said source containing materials adapted to react with impinging ions to produce neutrons of said energy level and means for accelerating a beam of ions from said ion source to said ion target.

5. An apparatus according to claim 4 wherein at least one additional layer of an atmosphere simulating material is disposed adjacent to said second layer.

6. An apparatus according to claim 5 wherein said first layer is uranium and said second layer is an organic polymeric substance.

7. An apparatus according to claim 6 wherein said moderating atmosphere simulating material is liquid nitrogen.

8. An apparatus according to claim 1 wherein said neutron source is a neutron generator having an ion source and a target plate spaced from said ion source and containing material adapted to react from said ion source to produce neutrons having an energy level of approximately 14 mev. and means for accelerating the ions from said ion source to said target plate, the first layer is uranium at least partially surrounding said target plate and there are a second layer of a polyethylene polymer surrounding said first layer, at least one additional layer of a cyrogenic atmosphere simulating material surrounding said polymer layer, and at least one detector in said cyrogenic layers for detecting the radiation conditions within said layer of atmosphere simulating material.

9. An apparatus according to claim 8 wherein said cyrogenic atmosphere simulating material is liquid nitrogen.

10. An apparatus for simulating various radiation spectra of detonated nuclear weapons to be used in combination with a neutron generator of the type wherein a beam of hydrogen ions is caused to impinge on a target plate containing a substance adapted to react with said impinging ions to produce fast neutrons, said apparatus comprising a closed-end cylinder of uranium surrounding at least 50% of the solid angles of the target plate for receiving bombardment of said fast neutrons to cause fission and nuclear reaction thereby providing degraded radiation spectrum of both neutrons and gammas, and at least one additional spectrum conditioning material surrounding said cylinder of uranium, the thickness and characteristics of the uranium and the spectrum conditioning materials being selected to allow respectively fission and nuclear reactions in the uranium and leakage of radiation from the spectrum conditioning material to provide a radiation environment outside of the spectrum conditioning material similar to the spectrum of one of the detonated nuclear weapons selected for simulation.

11. An apparatus according to claim 10 wherein said spectrum conditioning material is a borated plastic.

12. An apparatus according to claim 10 wherein said spectrum conditioning material is steel.

13. A method of simulating various radiation spectra produced by detonated nuclear weapons which comprises directing a beam of hydrogen ions to a target plate containing a material adapted to react with the impinging ions to produce neutrons having an energy level of approximately 14 mev., and surrounding the target plate with multiple layers of spectrum conditioning materials of which the first layer is capable of undergoing fission and nuclear reactions to provide a degraded spectrum of both neutrons and gammas and subsequent layer capable of moderating the resultant leakage radiation thereby simulating a selected nuclear weapon spectrum of the spectra of nuclear weapons.

14. A method for simulating various radiation spectra produced by detonated nuclear weapons which comprises directing a beam of hydrogen ions to a target plate containing a material adapted to react with the impinging ions to produce neutrons having an energy level of approximately 14 mev., surrounding at least 50 percent of the total solid angle of said target plate with a layer of uranium having a thickness sufficient to provide a leakage radiation of a degraded spectrum of neutrons and gammas included in which are a portion of the 14 mev. neutrons, and moderating the resultant leakage radiation with a subsequent layer of a spectrum conditioning material to simulate a selected thermonuclear weapon spectrum of the spectra of nuclear weapons.

15. A method for simulating an Ichiban spectrum which comprises passing a beam of 14 mev. neutrons through a layer of depleted uranium followed by a layer of steel, measuring the leakage radiation through said layers of uranium and steel, passing a second beam of 14 mev. neutrons through a second layer of depleted uranium followed by a layer of steel, said second layer of depleted uranium being different in thickness than said first layer of depleted uranium, measuring the leakage radiation through said second layers of depleted uranium and steel and, comparing said measurement to eliminate said 14 mev. neutron components thereby determining said Ichiban spectrum.

References Cited

UNITED STATES PATENTS

| | | | |
|---|---|---|---|
| 2,870,076 | 1/1959 | Koch | 176—17 |
| 2,933,442 | 4/1960 | Lawrence et al. | 176—11 |
| 2,982,709 | 5/1961 | Miles | 176—17 |
| 3,031,394 | 4/1964 | McCorkle et al. | 176—87 |
| 3,070,538 | 12/1962 | Spinrad et al. | 176—17 |
| 3,105,808 | 10/1963 | Lawson et al. | 176—87 |
| 3,106,535 | 10/1963 | Blanco | 176—88 |
| 3,291,694 | 12/1966 | Borst | 176—11 |

EUGENE R. CAPOZIA, *Primary Examiner.*

W. W. NIELSEN, *Assistant Examiner.*

U.S. Cl. X.R.

176—11; 260—349